United States Patent
Olds

(10) Patent No.: US 10,157,401 B1
(45) Date of Patent: Dec. 18, 2018

(54) ENGAGED VIEW RATE ANALYSIS

(71) Applicant: Google LLC, Mountain View, CA (US)

(72) Inventor: Timothy Olds, New York, NY (US)

(73) Assignee: Google LLC, Mountain View, CA (US)

( * ) Notice: Subject to any disclaimer, the term of this patent is extended or adjusted under 35 U.S.C. 154(b) by 445 days.

(21) Appl. No.: 14/887,641

(22) Filed: Oct. 20, 2015

Related U.S. Application Data

(60) Provisional application No. 62/181,034, filed on Jun. 17, 2015.

(51) Int. Cl.
*G06Q 30/00* (2012.01)
*G06Q 30/02* (2012.01)

(52) U.S. Cl.
CPC ................. *G06Q 30/0246* (2013.01)

(58) Field of Classification Search
None
See application file for complete search history.

(56) References Cited

U.S. PATENT DOCUMENTS

| | | |
|---|---|---|
| 2012/0166294 A1 | 6/2012 | Lieberman et al. |
| 2013/0014159 A1* | 1/2013 | Wiser ................. G06Q 30/0255 725/34 |
| 2014/0157306 A1 | 6/2014 | Deo et al. |
| 2014/0164102 A1 | 6/2014 | Bell et al. |
| 2014/0317653 A1 | 10/2014 | Mlodzinski |
| 2016/0366090 A1* | 12/2016 | Campbell ........... H04L 65/4084 |

* cited by examiner

*Primary Examiner* — Alvin L Brown
(74) *Attorney, Agent, or Firm* — Fish & Richardson P.C.

(57) ABSTRACT

Methods, systems, and apparatus, including computer programs encoded on a computer storage medium, for data processing and content distribution. In one aspect, a method includes providing skippable content items from a given content category to a user device; determining, for the user, an aggregate engagement level with the skippable content items based on portions of the skippable content items that were presented and whether the skippable content items were skipped; determining, for the user, an interest score for the given category based on comparing the aggregate engagement level to a population engagement level with skippable content items from the given content category; determining that the interest score of the user for the given category is below a specified threshold; and in response to receiving a subsequent request for a content item from the given content category distributing, to the user device, a non-skippable content item from the given category.

20 Claims, 4 Drawing Sheets

ENGAGED VIEW RATE ANALYSIS

PRIORITY CLAIM

This application claims the benefit of U.S. Provisional Patent Application No. 62/181,034, entitled "Engaged View Rate Analysis," filed Jun. 17, 2015. The disclosure of the foregoing application is incorporated herein by reference in its entirety.

BACKGROUND

This specification relates to data processing and content distribution.

The Internet provides access to a wide variety of resources. For example, video and/or audio files, as well as web pages for particular subjects or particular news articles are accessible over the Internet. Access to these resources presents opportunities for advertisements to be provided with the resources. For example, a web page can include advertisement slots in which advertisements can be presented. These advertisements slots can be defined in the web page or defined for presentation with a web page.

Video advertisements are a type of advertisement that can be presented in a web page, and some video advertisements may be selected to be skipped by the user. The performance of these video advertisements may be analyzed based on a number of users that have requested presentation of the video advertisement (e.g., by initiating playback of the video advertisement).

SUMMARY

This specification describes technologies relating to determining user interest in particular content categories based on a portion of a content item of the particular content category presented at a user device and whether the content item was selected to be skipped prior to a completed playback of the content item.

In general, one innovative aspect of the subject matter described in this specification can be embodied in a method that includes the actions of providing skippable content items from a given content category to a user of a user device, and determining, for the user, an aggregate engagement level with the skippable content items from the given content category based on portions of the skippable content items that were presented at the user device and whether the skippable content items were skipped by the user. Additionally, the method may include determining, for the user, an interest score for the given category based on a comparison of the aggregate engagement level to a population engagement level with skippable content items from the given content category. Further, the method may include determining that the interest score of the user for the given category is below a specified threshold, and in response to receiving a subsequent request for a content item from the given content category, distributing, to the user device, a non-skippable content item from the given category.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes techniques for providing content items to users. The provided content items can be from content categories that are of interest to the user. In general, a viewer's interactions with particular content items may be monitored, such as the advertisements the user skips, and the system may then select other advertisements that are determined to be more like advertisements the user has watched and less like those the user has skipped.

As described in more detail below, skippable ads from a given content category are provided to a user when the user's skip rate of ads in the given content category is similar to the overall skip rate for ads in that given content category. For example, assume that the overall skip rate for ads from content category A is 20%, and that a first user's skip rate for ads from content category A is 18%. In this example, the first user's skip rate is similar to (and less than) the overall skip rate, such that skippable ads from content category A may still be provided to the first user. Now assume that a second user's skip rate for ads from content category A is 50%, which is considered to be substantially higher than the overall skip rate. In this situation, non-skippable ads from content category A can be provided to the second user based on the second user's skip rate being significantly higher (e.g., at least a specified or threshold amount higher) than the overall skip rate.

Figure 1:
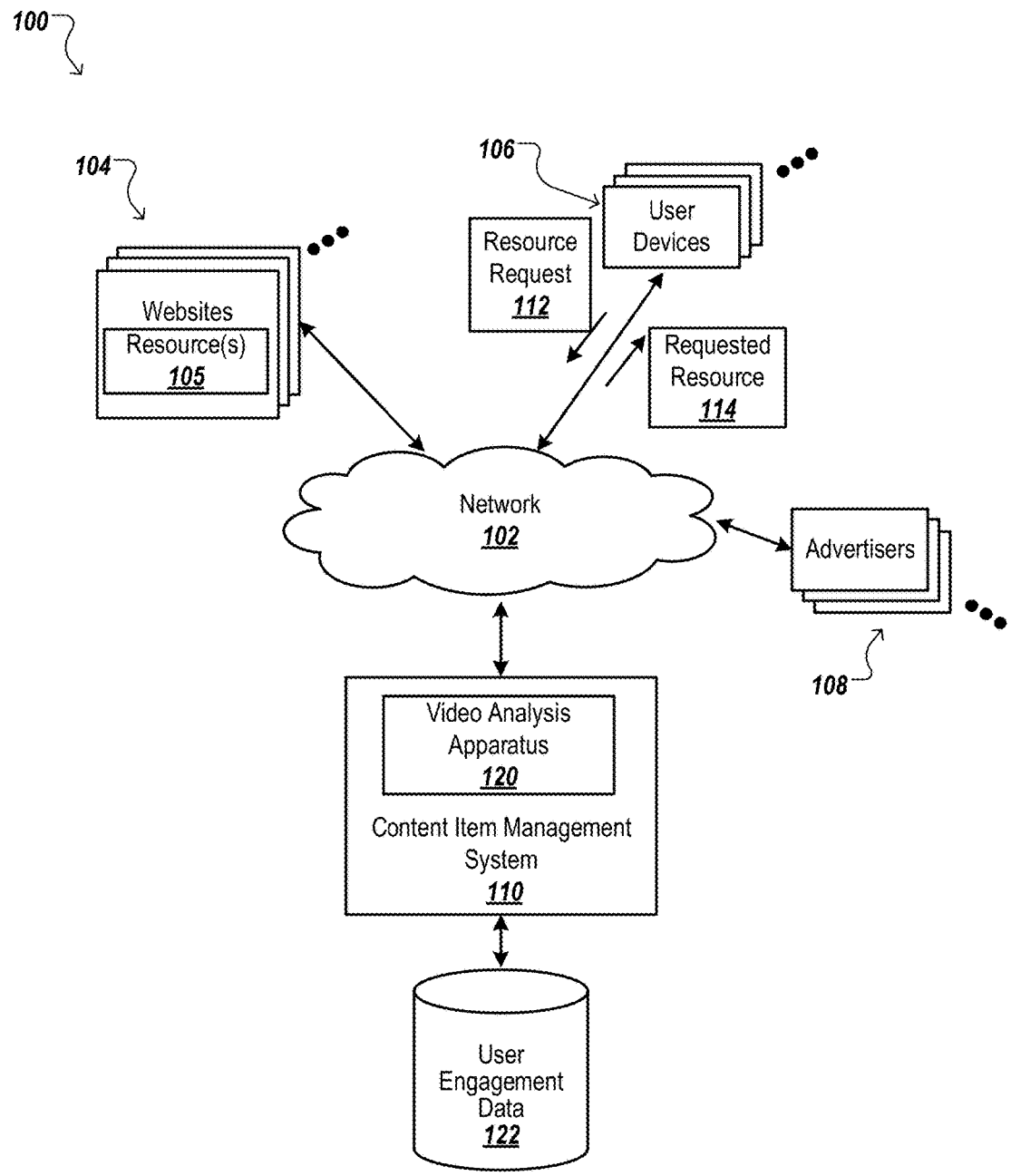
FIG. 1 a block diagram of an example environment in which a content distribution system manages distribution of content items.

FIG. 1 is a block diagram of an example environment 100 in which a content distribution system 110 manages distribution of content items. The example environment 100 includes a network 102, such as a local area network (LAN), a wide area network (WAN), the Internet, or a combination thereof. The network 102 connects websites 104, user devices 106, advertisers 108, and the content distribution system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages, and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions. Units of content that are presented in (or with) resources are referred to as content items, and examples of content items include advertisements that are presented with a web page, video files that are presented with a web page (e.g., in a video player), and/or audio files that are presented with a web page.

A user device 106 is an electronic device that is under the control of a user and is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the World Wide Web or a local area network. As described above, there may be many different types of devices, such as desktop devices, mobile devices, television devices, and the like. Often a user may be associated with a user identifier, such as an account identifier managed by the content distribution system 110. The user identifier may be used to associate multiple user devices on a per-user basis. A user device 106 can submit a resource request 112 that requests a resource 105 from a website 104. In turn, data representing the requested resource 114 can be provided to the user device 106 for presentation by the user device 106.

The requested resource 114 can be, for example, a home page of a website 104 (e.g., a home page for a video sharing site), a search results page in which search results are presented, or another resource 105. Data representing a requested resource 114 can also include data specifying a portion of the resource (e.g., a portion of a web page or a portion of a user display (e.g., a presentation location of a slot of a web page) in which advertisements (or other video content items) can be presented. Throughout this document, these specified portions of the resource or user display are referred to as advertisement slots. Advertisement slots can also be defined within a video and/or prior to or following presentation of the video. For example, an advertisement slot can be inserted at the beginning, at the end, or at a pre-specified location in the video, and other videos (e.g., video advertisements) can be presented in these advertisements slots when a user device 106 requests presentation of the video in which the advertisement slot is defined. Additionally, advertisement slots may take up the entire display of a user device 106 or a portion of the display of the user device 106.

When a resource 105 (e.g., a web page and/or a video) is requested by a user device 106 as resource request 112, the content distribution system 110 may also receive a request for advertisements to be provided in an advertisement slot that has been defined for the resource 105. The request for advertisements can include characteristics of the advertisement slot in which the requested advertisement will be presented, and can be provided to the content distribution system 110.

For example, a reference (e.g., URL) to the requested resource 114 (e.g., a requested web page and/or a requested video) in which the advertisement slot is defined, a size of the advertisement slot (e.g., temporal and/or special), and/or media types that are eligible for presentation in the advertisement slot can be provided to the content distribution system 110. Similarly, keywords associated with a requested resource ("resource keywords") or labels (i.e., phrases of one or more words) associated with a requested video can also be provided to the content distribution system 110 to facilitate identification of advertisements that are relevant to the requested resource 114.

Based on data included in the request, the content distribution system 110 selects advertisements that are eligible to be provided in response to the request ("eligible advertisements"). For example, eligible advertisements can include advertisements having characteristics matching the characteristics of the advertisement slots and that are identified as relevant to specified resource keywords and/or labels. In some implementations, advertisements having targeting keywords that match the resource keywords are selected as eligible advertisements by content distribution system 110.

The eligible advertisements can include video advertisements. Video advertisements can include, for example, video content items that have been created exclusively for presentation in advertisement slots or other video content items that have been identified, by an advertiser, as being available for presentation in advertisement slots. Additionally, some of the video advertisements may be able to be skipped by the user. For example, the user may select to skip (e.g., by selecting a "skip" button in the display of the user device 106) a currently shown item in the display of the user device 106.

Advertisers may be interested in evaluating the performance of their video content items. For example, advertisers may want to evaluate portions of the total duration of video advertisements that users watch before terminating presentation of the video advertisement (e.g., by closing the browser window, skipping the video advertisement, or otherwise terminating presentation).

In some implementations, the content distribution system 110 utilizes a video analysis apparatus 120 that tracks presentations of video content items (e.g., video advertisements) along with how long video content items are presented in each impression and whether the user selected to skip the video content item. The video analysis apparatus 120 may use playback data received from the user device 106 in which the video content items are being presented. For example, as described in more detail below, the user device 106 (or browser) can be configured to determine when presentation of a video has been selected to be skipped or reaches the end of a specified portion of the total duration of the video, generate playback data indicating the presentation, and transmit the playback data to the video analysis apparatus 120. In turn, the video analysis apparatus 120 stores the received playback data in user engagement data 122, which includes a data store that stores the playback data for videos. The video analysis apparatus 120 is depicted as being implemented as part of the content distribution system 110, but can also be implemented entirely, or in part, independent of the content distribution system 110.

The content distribution system 110 and/or video analysis apparatus 120 includes a data storage system that stores user engagement data 122. The user engagement data 122 may include data that identifies user interactions in relation to content items that are presented to the user device 106 of the user. For example, the user engagement data 122 may include data that indicates whether a user selected to skip a particular content item that is presented to the user device 106, a category associated with the particular content item, and how long the particular content item was presented to the user device 106.

The user engagement data 122 may determine an engagement level for each user with respect to content items and categories of the content items (e.g., based on the product or service associated with the content item). The engagement level of a user with a given content item may be determined based on a portion of the content item presented at the user device and whether the content item was skipped prior to a completed playback of the content item.

The engagement level for a group of content items from a given content category can be aggregated, and used to determine the user's interest in the content category. In some implementations, different groups of content items may be categorized into different content categories (e.g., sports, cosmetics, travel, investing, religion, etc.), and an aggregate engagement level of the user with each content category may be determined. The content categories may be pre-defined and/or later determined or modified. The content distribution system 110 may group each of the content items into the respective content categories, for example, based on the subject matter to which the content item is related.

In some implementations, a user's aggregate engagement level in a given content category can be compared to an engagement level in the given content category for a group of other users (e.g., all other users or a subset of other users). This comparison can be used to determine an interest score for the user relative to the given content category. The engagement level for the group of other users may be referred to as a population engagement level, and the population engagement level may be determined for each content category of content items, based on users' engagement with various content items from the content category.

The user engagement data 122 may include the interest score for the user that was determined based on the comparison of the aggregate engagement level of the user for one or more content item categories to the population (e.g., group) engagement level. Moreover, the user engagement data 122 may include an interest score for one or more content item categories for each of the users.

In some implementations, the user engagement level for a particular content category may be based on a percentage or number of content items presented at the user device 106 in that particular category and/or a percentage or number of those presentations that that were classified as engaged views. An engaged view may be determined to have occurred when the video content item is presented for more than a threshold amount of time (e.g., 30 seconds) or percentage of time (e.g., 50% of the content item duration length).

Additionally, in some implementations, an engaged view may be determined to have occurred for each content item that the user does not skip. An engaged view may also be determined to have occurred when the user of the user device 106 interacts with the content item by, for example, clicking (or otherwise selecting) the content item or a link associated with the content item to get more information about the product or service associated with the content item.

A user engagement level may be determined, for example, in a situation where a user is presented with five content items in the sports category and an engaged view was reached for three of the content items, then the engagement level for the particular user in the sports category may be 60%. Further, an interest score for the particular user may be determined in the sports category by comparing the engagement level of the user in the category to the engagement level of other users. For example, if the other users had an engagement level of 40% in the sports category, then the particular user's interest score may be determined to be higher than the population of users interest score. Consequentially, the video analysis apparatus 120 may determine that the user has a higher interest in the particular category associated with the interest score (e.g., sports category) than the interest of the population in general. In some implementations, the interest score may be determined by the particular user's engagement level/the population user engagement level (e.g., 0.60/0.40=1.5).

Additionally, in some implementations, the user's interest score for the particular category may be normalized on a scale between, for example, −1 and 1. For example, scores below zero (i.e., less than 50% of the normalization) may indicate a low level of interest in the particular category, interest scores at or near zero may indicate an average interest level (or an insufficient sample size or data for a determination), and interest scores above zero may indicate a higher interest level or affinity for the particular category. Further, the interest score for users in the different content categories may take into account other factors, for example, that particular user's skip content items more than other users regardless of the content category from which the content item is from, and users, as a whole, may skip content items from particular content categories more than content items from other content categories.

In some implementations, a user's interest scores for the different categories may be used by the content distribution system 110 to determine future content items that will be provided to the user device. For example, skippable content items can be provided to the user when the user's interest score for a given content category is above a threshold, and non-skippable content items can be provided to the user when the user's interest score in a different content category is less than a specified amount.

A threshold interest score may be used to determine the level of interest by the user in a particular content category. For example, if the interest scores are scaled and normalized between −1 and 1, the interest score threshold may be 0. If the user showed a low interest score for a particular category (e.g., lower than the average interest score for the group of users), then when a content item is requested in the future by the user device 106 of the user, a content item from a different category may be presented (e.g., a category in which the user has shown a higher interest score) to the user.

Additionally, in some implementations, based on the interest score of the user for the different categories, the content distribution system 110 may cause a non-skippable content item to be presented to the user. Such a determination may be made, for example, if the user skips an unproportioned number of skippable content items (e.g., based on an average) or if the interest score of the user in each of the categories is below the average (e.g., below zero in the −1 and 1 scale).

Figure 2:
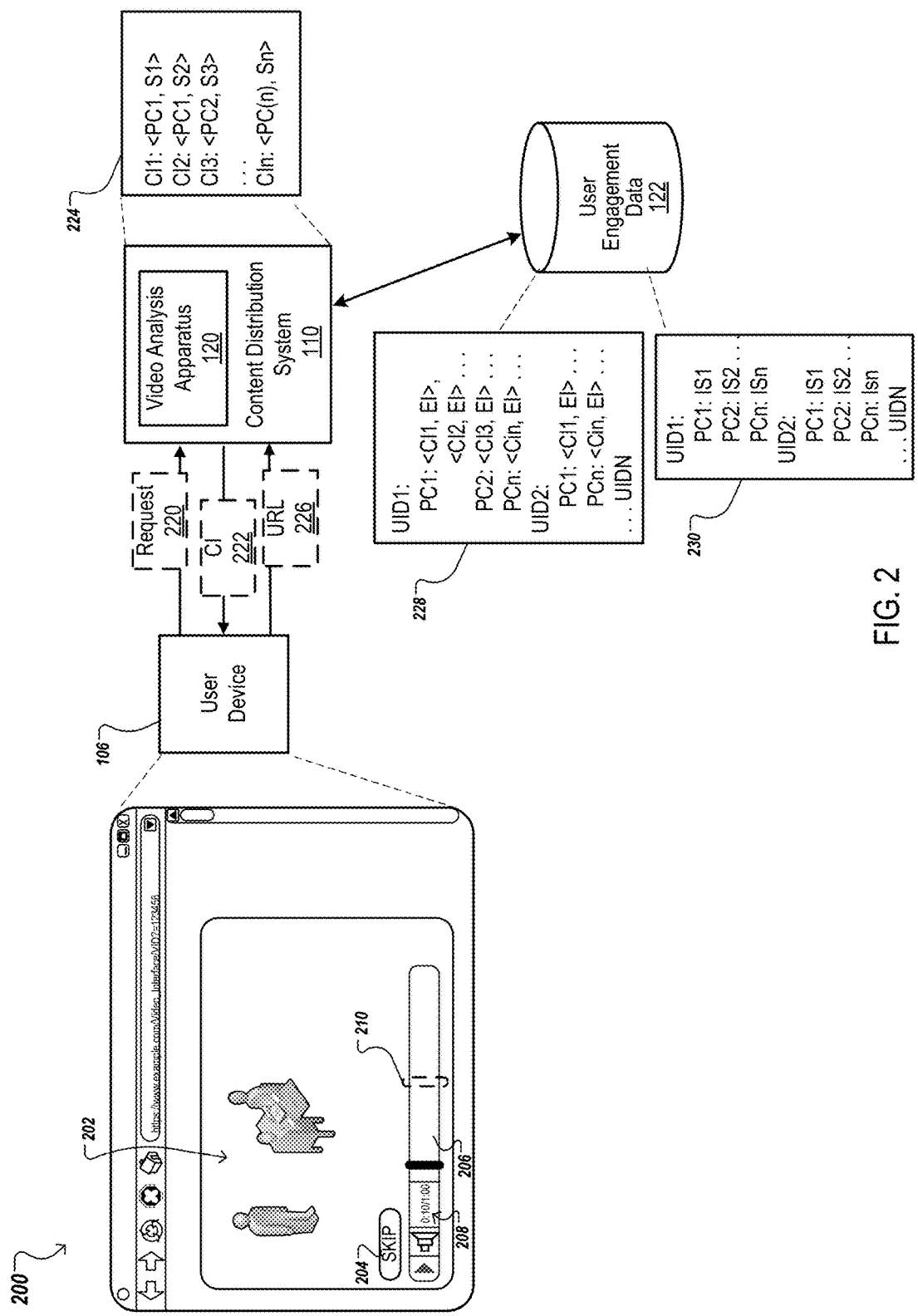
FIG. 2 is an example screen shot of a content item presented at the user device along with a system diagram of interaction between the user device and content distribution system in the presentation.

FIG. 2 is an illustration 200 of example interactions between the user device 106 and content distribution system 110 during the presentation of a content item at the user device. The user device 106 includes a video presentation area 202 in which videos are presented. For example, upon receipt of a video content item, the video player can load (or begin to load) the video and await user interaction before beginning presentation of the video, or alternatively, begin playback of the received video content item immediately upon receipt of any portion of the video or after a pre-specified portion (e.g., 10%) of the video has been received. The presentation area 202 may be the advertisement slot as well.

The data representing the video content item that is received by the user device 106 will generally include data specifying a total duration 206 of the video that is being received. For example, if a particular video content item is 1 minute long, then the data for the video content item can include "total duration" data specifying 1 minute as the total duration of the video. The total duration data may be used to determine a portion of the total duration of the video that has been received by the video player, and further to determine playback times at which one or more different segments of the video are considered to have ended. Additionally, the presentation area 202 may include a skip option 204 for the video content item if the content item is a skippable content item. The skip option 204 may be at any location within the presentation area 202.

Further, the presentation area 202 may include a duration indicator 208 to indicate a time duration of the video content item and/or a period of the time duration of the video content item that has passed. An engaged view indicator 210 is included in the presentation area 202, which may be visible or not visible in the display of the user device 106. The engaged view indicator 210 is described further below.

A user device 106 may submit a request 220, and the content distribution system 110 can select a content item 222 to provide in response to the request 220. In some implementations, the content item 222 may be a skippable video content item that the user of the user device 106 may skip, e.g., by use of the skip option 204, at some point in the presentation of the content item 222.

Each video content item (CI) in a set of available content items 224 may be associated with a product category (PC) and a string (S) to provide to the user device 106 to initiate and present the video content item. In some implementations, the string may be an Extensible Markup Language (XML) string including one or more identifiers that are used to indicate when the video content item is skipped, when the video content item has reached an engaged view (e.g., a certain time duration or a percentage of the time duration of the content item), when an end of the video content item has been reached, among others.

The identifier, in some implementations, may be a unique Uniform Resource Locator (URL) that is initiated when a particular action is performed with respect to the video content item (e.g., the video content item is skipped or an engaged view has occurred, among others). For example, the video content item may indicate the display pixels that are associated with the skip option 204 in the display, and the unique URL to indicate a skip selection may be initiated when a user of the user device selects one or more display pixels that are associated with the skip option 204 in the presentation of the video content item. Additionally, there may be display pixels that are associated with the engaged view indicator 210 in the display. The display pixels of the engaged view indicator 210 may be identified based on a time or percentage shown in the duration indicator 208. In other implementations, when the video content item is presented for the given engaged view time period, the engaged view indicator 210 may be initiated without relation to the duration indicator. The unique URL to indicate an engaged view may be initiated when the video content item has been presented for the given engaged view threshold.

The content distribution system 110 will send a video content item to the requesting user device, which includes the unique URLs (226) in the associated string of the video content item. The string and other content of the video content item may be encrypted prior to sending the video content item to the user device.

Upon presentation of the video content item, the unique URL associated with a particular actions (e.g., the video content item is selected to be skipped or an engaged view has occurred, among others) may be initiated (e.g., pinged) at the time the action is performed (e.g., identified display pixels are selected or the video content item has been presented for a given period of time, among others) is performed at the video content item. The initiation of the unique URL 226 may be relayed back to the content distribution system 110, and if the string is encrypted, then a decryption process may occur at the content distribution system 110 upon receiving the indication of initiating the particular unique URL 226. The initiation of the unique URL 226 may also include the user identifier of the user device 106 where the initiation occurred.

The information of the unique URL that was initiated may be stored, and further sorted, in the user engagement data 122. For example, the content items (CI) and its associated engagement information (EI) that have been presented to each user identifier (UID) may be sorted based on product category (PC), as shown in the dataset 228. The engagement information for each content item may indicate whether the content item was skipped or if an engaged view occurred (e.g., based on the initiation of one or more of the unique URLs), as previously described. Additionally, the content items may be sorted for each user identifier based on the product categories associated with each content item. Further, as shown in the dataset 230, an interest score for each product category may be determined for each user identifier based on comparing the engagement information of the user identifier to engagement information of other user's (user identifiers), as previously described.

Figure 3:
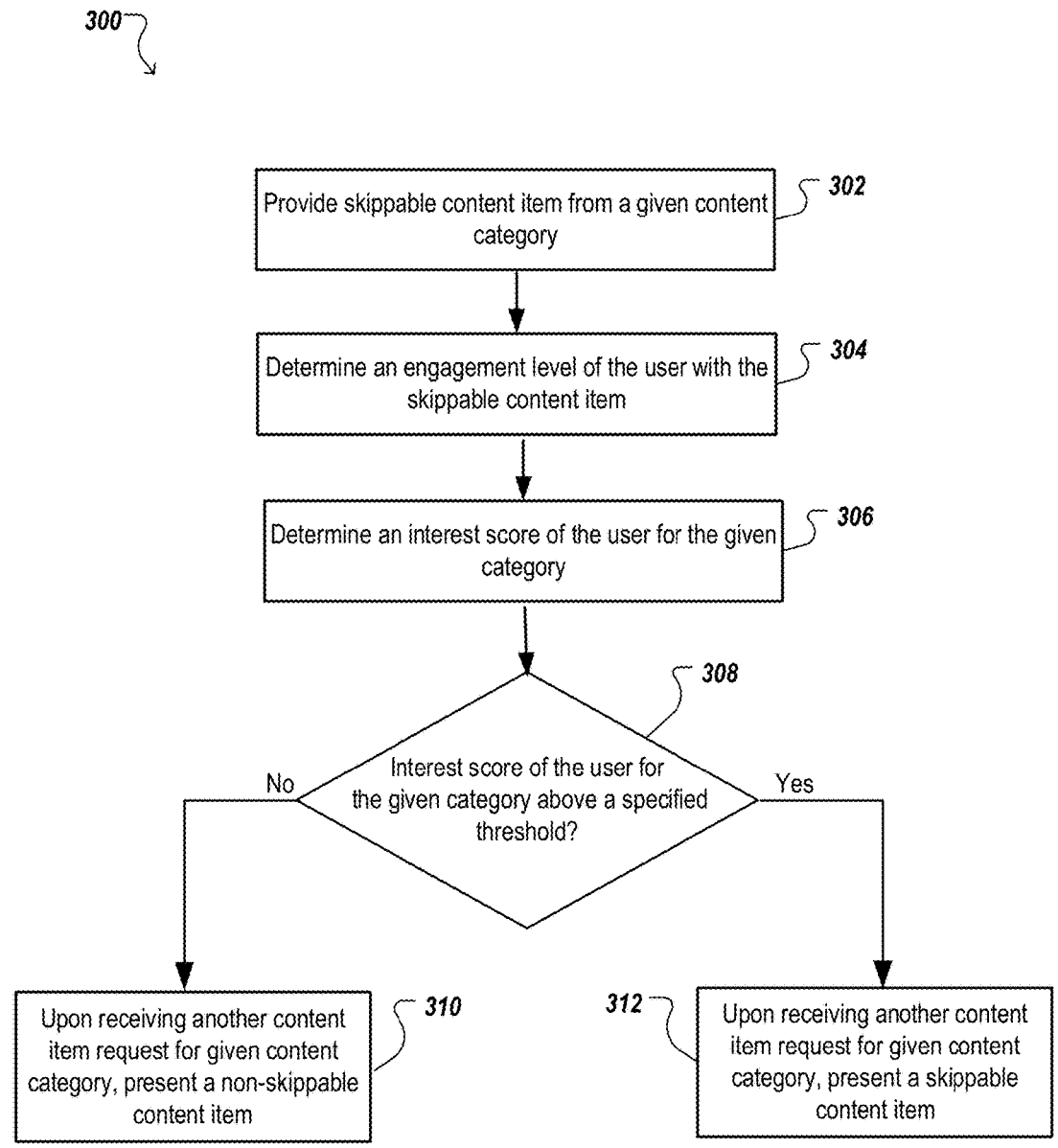
FIG. 3 is a flow chart of an example process for determining interest scores of the user for given product categories based on the engagement level of the user.

FIG. 3 is a flow chart of an example process 300 for determining interest scores of the user for given product categories based on the engagement level of the user. The process 300 can, for example, be implemented by content distribution system 110 and video analysis apparatus 120. In some implementations, the operations of the example process 300 can be implemented as instructions stored on a non-transitory computer readable medium, where the instructions cause a data processing apparatus to perform operations of the example process 300.

Skippable content items from a given content category are provided to a user of a user device (302). As previously discussed, the content distribution system 110 may provide skippable video advertisements to a user. The skippable video advertisements may be skipped by the user, for example, through user interaction with a skip control presented in a user interface. The user may select to skip the video advertisement at a certain point of time in the presentation of the video advertisement. Some of the provided video advertisements may be from a same given content category, and may be provided to the user over some time period. The user engagement data 122 for the particular user associated with the user device 106 may be used by the content distribution system 110 to determine the particular content category from which the content item is selected.

In some implementations, a skip pixel and/or an engaged pixel can be included in the skippable content items, and the skippable content item can be encrypted. The skip pixel is a pixel that is activated when the user skips the skippable content item. The engaged pixel is a pixel that is activated when playback of the skippable content item reaches a given point (e.g., 30 seconds or 50% of playback). In some implementations, a view complete pixel can also be included in the skippable content items. The view complete pixel is a pixel that is activated when playback of the skippable content item reaches an end of playback. Activation of any of the pixels initiates submission of data specifying that the corresponding action has occurred.

For example, the content item may indicate display pixels that are associated with a skip option in the display, as described in the discussion of FIG. 2, and a selection by the user of at least one of the skip pixels in the display of the user device may activate the unique URL to indicate a skip selection. Additionally, there may be display pixels that are associated with one or more engaged pixels, as described in the discussion of FIG. 2 (e.g., the engaged view indicator 210), in the display. The unique URL may be initiated upon the activation of one or more of the engaged pixels. The activation of the skip pixel, engaged pixel, and/or view complete pixel may be logged by the content distribution system 110 and the data stored in the user engagement data 122. For example, upon the initiation of the URL associated with the skip pixel, engaged pixel, and/or view complete pixel, the user device 106 may transmit the URL, which may be encrypted, to the content distribution system 110. The content distribution system 110 may decrypt the received URL, if needed, and log information related to the received URL in the user engagement data 122. Each presentation of a content item, including the initiation of any of the previously mentioned URLs, may be logged and stored in the user engagement data 122, which may be sorted and stored by content category.

An aggregate engagement level with skippable content item from a given content category is determined for the user (304). In some implementations, the aggregate engagement level is determined based, in part, on portions of the skippable content items that were presented at the user device. For example, when playback of a skippable content item reaches the engaged pixel, the engaged pixel will fire, and an indication that the engaged pixel associated with the skippable content item is received from the user device. Similarly, if playback of the skippable content item reaches the view complete pixel, an indication that the view complete pixel was fired will be received from the user device.

In some implementations, receiving the indication that the engaged pixel or the view complete pixel constitutes an engaged view of the content item, such that subsequent receipt of the skip pixel will not be counted as a skip of the content item. The engagement level of the user may be based on whether the skip pixel, engaged pixel, and/or view complete pixel were selected or initiated, as previously described (e.g., by initiating the URL associated with the particular pixel(s)). The user's engagement level for a particular content category may be based on the number of engaged pixels and/or view complete pixels that were activated out of the total number of content items presented to the user from that particular content category. For example, a user engagement level may be determined, for example, in a situation where a user is presented with five content items in the sports category and the engaged view pixel(s) were activated in three of the content items, then the engagement level for the particular user in the sports category may be 60%.

In some implementations, a user's aggregate engagement level with skippable content items from a given content category can be based on what portion of the skippable content item playbacks were skipped or otherwise terminated prior to becoming engaged views. For example, the user's aggregate engagement level can be based on a skip rate of the content items in the given category relative to all presentations of the content items in the given category to the user. Generally, the user's aggregate engagement level for a given content category will be inversely proportional to the user's skip rate for content items in the given content category.

An interest score for the given category may be determined based on comparing an aggregate engagement level of the user to a population engagement level in various skippable content items from the given content category (308). Based on the previous example in the previous step, if the other users had an engagement level of 40% in the sports category, then the particular user's interest score may be determined to be higher than the population of users interest score. Consequentially, the video analysis apparatus 120 may determine that the user has an interest in the particular category associated with the interest score (e.g., sports category). Additionally, the interest score may be based on based on dividing the population user engagement level by the particular user's engagement level (e.g., 0.60/0.40=1.5). In some implementations, the user's interest score for the particular category may be normalized on a scale between, for example, −1 and 1.

The interest score associated with the user for the given category may be compared to a specified threshold (308). The threshold may be an interest score threshold to indicate an interest level of the user in the particular content category. For example, if the interest scores are scaled and normalized between −1 and 1, the interest score threshold may be zero, meaning that those users that have an interest score in the top half will be above the threshold. However, the threshold may be a different number, or the threshold may separate a different percentage of users.

If the interest score associated with the user for the given category is below the specified threshold, then when the user device 106 provides another request for a content item in relation to the given content category, a non-skippable content item in relation to the given category may be presented (310). If the user showed a low interest score for a particular category (e.g., lower than the average interest score for the group of users), then when a content item is requested in the future by the user device 106 of the user, a content item from a different category may be presented (e.g., a category in which the user has shown a higher interest score) to the user. Additionally, in some implementations, based on the interest score of the user for the different categories, the content distribution system 110 may cause a non-skippable content item to be presented to the user. Such a determination may be made, for example, if the user skips an unproportioned number of skippable content items (e.g., based on an average) or if the interest score of the user in each of the categories is below the average (e.g., below zero in the −1 and 1 scale).

If the interest score associated with the user for the given category is at or above the specified threshold, then when the user device 106 provides another request for a content item in relation to the given content category, another skippable content item in relation to the given category may be presented (312). If the user showed an interest score above a threshold for a particular category (e.g., higher than the average interest score for the group of users), then when a content item is requested in the future by the user device 106 of the user, a content item from the same content category may be presented to the user, as the user has shown an interest in the content category.

Additionally, in some implementations, when the user device 106 provides another request for a content item, the content distribution system 110 may select the content category from which the content item is selected. For example, when the content distribution system 110 may receive a request for a content item, the content distribution system 110 may determine, based on the interest score for the particular user in one or more content categories, a content category from which to select the content item. The user may, for example, have a 1.2 interest score in the sports category, a 0.8 interest score in the travel category, and a 1.5 interest score in the investing category. The content distribution system 110 may select a content item from the content category that has the highest interest score for the user, which in the current example is the investing category. However, in other implementations, such a configuration is not required and the content distribution system 110 may randomly select the content category from which to select the content item or use another methodology in order to select the content category.

Figure 4:
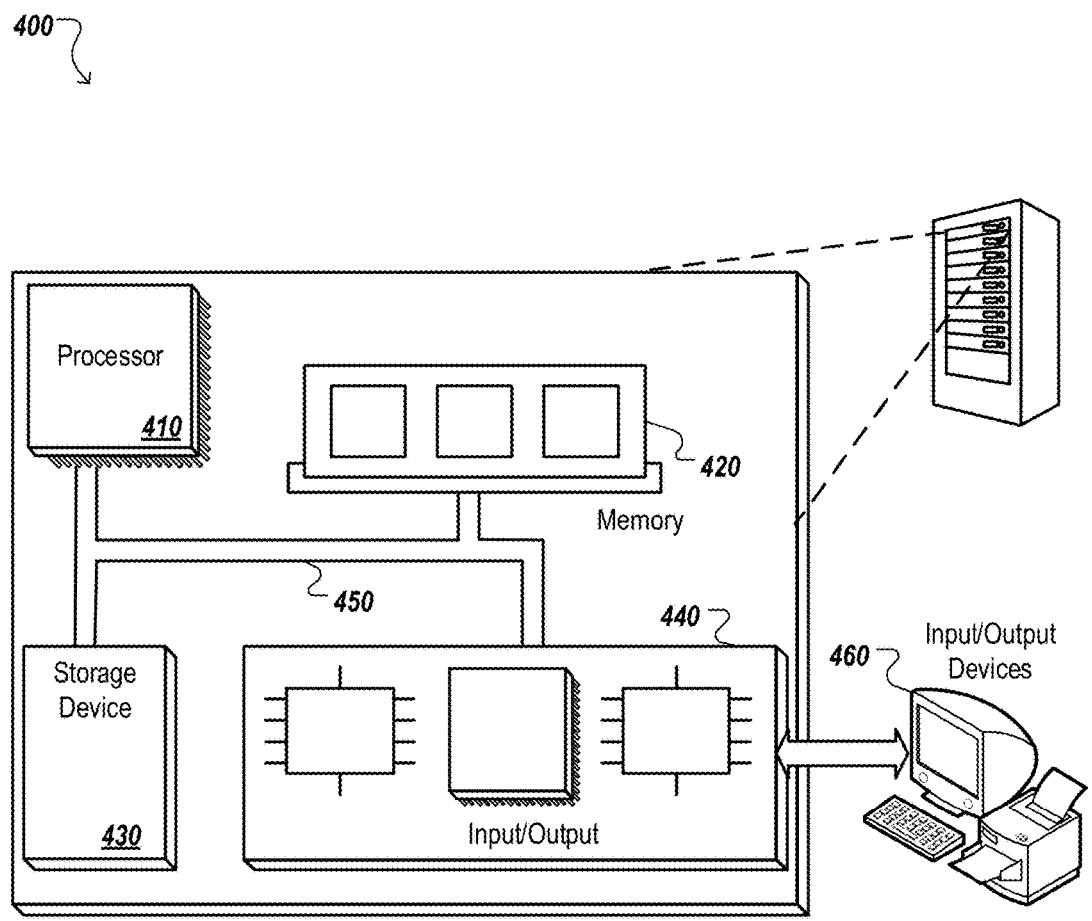
FIG. 4 is a block diagram of an example computer system that can be used to perform operations described herein.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

What is claimed is:
1. A method, comprising:
 providing, by the data processing apparatus to a user device of a user, skippable content items that are each a video that plays before presentation of another video that was selected by the user, that each include an initial portion that is not skippable and a remaining portion that the user can skip after the initial portion of each skippable content item plays on the user device, and that is from a given content category;

determining, by the data processing apparatus and for the user, an aggregate engagement level with the skippable content items from the given content category based on the remaining portions of the skippable content items that were presented at the user device based on the user skipping the remaining portions of the skippable content items;

determining, by the data processing apparatus and for the user, an interest score for the given category based on a comparison of the aggregate engagement level to a population engagement level with skippable content items from the given content category, the population engagement level reflecting a portion of other users who skip, before other videos selected by each user of the population, the remaining portions of the skippable content items from the given content category;

determining, by the data processing apparatus, that the interest score of the user for the given category is below a specified threshold; and in response to receiving a subsequent request for a content item from the given content category and based on determining that the interest score for the given category is below the specified threshold, distributing, to the user device, a non-skippable content item from the given category.

2. The method of claim 1, further comprising:
determining, by the data processing apparatus and for the user, that the interest score for a different content category is above the specified threshold; and
in response to receiving another subsequent request for a content item from the given content category and based on determining that the interest score for the different category is above the specified threshold, distributing, to the user device, a skippable content item from the different category.

3. The method of claim 1, further comprising:
in response to receiving another request for a content item from the user device, selecting, by the data processing apparatus, one of a plurality of content categories based on the interest score of a particular content category; and
presenting, by the data processing apparatus, a content item from the one of the plurality of content category to the user device.

4. The method of claim 1, wherein determining the aggregate engagement level comprises:
receiving, from the user device, an indication that one of (1) a skip pixel associated with skipping a given skippable content item was activated at the user device, or (2) an engaged pixel associated with the given skippable content item reaching a threshold portion of presentation at the user device was activated at the user device.

5. The method of claim 4, further comprising:
including the skip pixel and the engaged pixel in the given skippable content item for activation; and
encrypting the skippable content item.

6. The method of claim 5, further comprising:
prior to determining the aggregate engagement level, receiving, by the data processing apparatus, skippable content item information from the user device; and
decrypting, by the data processing apparatus, the skippable content item information, the skippable content item information specifying whether the skip pixel or the engagement pixel were activated.

7. The method of claim 1, wherein determining the interest score comprises normalizing the interest score of the user for the given content category prior to comparing the interest score to the specified threshold.

8. A system, comprising:
a processor; and
a computer-readable medium coupled to the processor and having instructions stored thereon, which, when executed by the processor, cause the processor to perform operations comprising:

providing, by the data processing apparatus to a user device of a user, skippable content items that are each a video that plays before presentation of another video that was selected by the user, that each include an initial portion that is not skippable and a remaining portion that the user can skip after the initial portion of each skippable content item plays on the user device, and that is from a given content category;

determining, by the data processing apparatus and for the user, an aggregate engagement level with the skippable content items from the given content category based on the remaining portions of the skippable content items that were presented at the user device based on the user skipping the remaining portions of the skippable content items;

determining, by the data processing apparatus and for the user, an interest score for the given category based on a comparison of the aggregate engagement level to a population engagement level with skippable content items from the given content category, the population engagement level reflecting a portion of other users who skip, before other videos selected by each user of the population, the remaining portions of the skippable content items from the given content category;

determining, by the data processing apparatus, that the interest score of the user for the given category is below a specified threshold; and in response to receiving a subsequent request for a content item from the given content category and based on determining that the interest score for the given category is below the specified threshold, distributing, to the user device, a non-skippable content item from the given category.

9. The system of claim 8, further comprising:
determining, by the data processing apparatus and for the user, that the interest score for a different content category is above the specified threshold; and
in response to receiving another subsequent request for a content item from the given content category and based on determining that the interest score for the different category is above the specified threshold, distributing, to the user device, a skippable content item from the different category.

10. The system of claim 8, further comprising:
in response to receiving another request for a content item from the user device, selecting, by the data processing apparatus, one of a plurality of content categories based on the interest score of a particular content category; and
presenting, by the data processing apparatus, a content item from the one of the plurality of content category to the user device.

11. The system of claim 8, wherein determining the aggregate engagement level comprises:

receiving, from the user device, an indication that one of (1) a skip pixel associated with skipping a given skippable content item was activated at the user device, or (2) an engaged pixel associated with the given skippable content item reaching a threshold portion of presentation at the user device was activated at the user device.

12. The system of claim 11, further comprising:
including the skip pixel and the engaged pixel in the given skippable content item for activation; and
encrypting the skippable content item.

13. The system of claim 12, further comprising:
prior to determining the aggregate engagement level, receiving skippable content item information from the user device; and
decrypting the skippable content item information, the skippable content item information specifying whether the skip pixel or the engagement pixel were activated.

14. The system of claim 8, wherein determining the interest score comprises normalizing the interest score of the user for the given content category prior to comparing the interest score to the specified threshold.

15. A computer-readable medium having instructions stored thereon, which, when executed by a processor, cause the processor to perform operations, comprising:
providing, by the data processing apparatus to a user device of a user, skippable content items that are each a video that plays before presentation of another video that was selected by the user, that each include an initial portion that is not skippable and a remaining portion that the user can skip after the initial portion of each skippable content item plays on the user device, and that is from a given content category;
determining, by the data processing apparatus and for the user, an aggregate engagement level with the skippable content items from the given content category based on the remaining portions of the skippable content items that were presented at the user device based on the user skipping the remaining portions of the skippable content items;
determining, by the data processing apparatus and for the user, an interest score for the given category based on a comparison of the aggregate engagement level to a population engagement level with skippable content items from the given content category, the population engagement level reflecting a portion of other users who skip, before other videos selected by each user of the population, the remaining portions of the skippable content items from the given content category;
determining, by the data processing apparatus, that the interest score of the user for the given category is below a specified threshold; and
in response to receiving a subsequent request for a content item from the given content category and based on determining that the interest score for the given category is below the specified threshold, distributing, to the user device, a non-skippable content item from the given category.

16. The computer-readable medium of claim 15, further comprising:
determining, by the data processing apparatus and for the user, that the interest score for a different content category is above the specified threshold; and
in response to receiving another subsequent request for a content item from the given content category and based on determining that the interest score for the different category is above the specified threshold, distributing, to the user device, a skippable content item from the different category.

17. The computer-readable medium of claim 15, further comprising:
in response to receiving another request for a content item from the user device, selecting, by the data processing apparatus, one of a plurality of content categories based on the interest score of a particular content category; and
presenting, by the data processing apparatus, a content item from the one of the plurality of content category to the user device.

18. The computer-readable medium of claim 15, wherein determining the aggregate engagement level comprises:
receiving, from the user device, an indication that one of (1) a skip pixel associated with skipping a given skippable content item was activated at the user device, or (2) an engaged pixel associated with the given skippable content item reaching a threshold portion of presentation at the user device was activated at the user device.

19. The computer-readable medium of claim 18, further comprising:
including the skip pixel and the engaged pixel in the given skippable content item for activation; and
encrypting the skippable content item.

20. The computer-readable medium of claim 15, wherein determining the interest score comprises normalizing the interest score of the user for the given content category prior to comparing the interest score to the specified threshold.

* * * * *